Oct. 6, 1936.     W. B. STOUT ET AL     2,056,223
BRAKE SYSTEM FOR VEHICLES
Filed Oct. 16, 1933     3 Sheets-Sheet 1
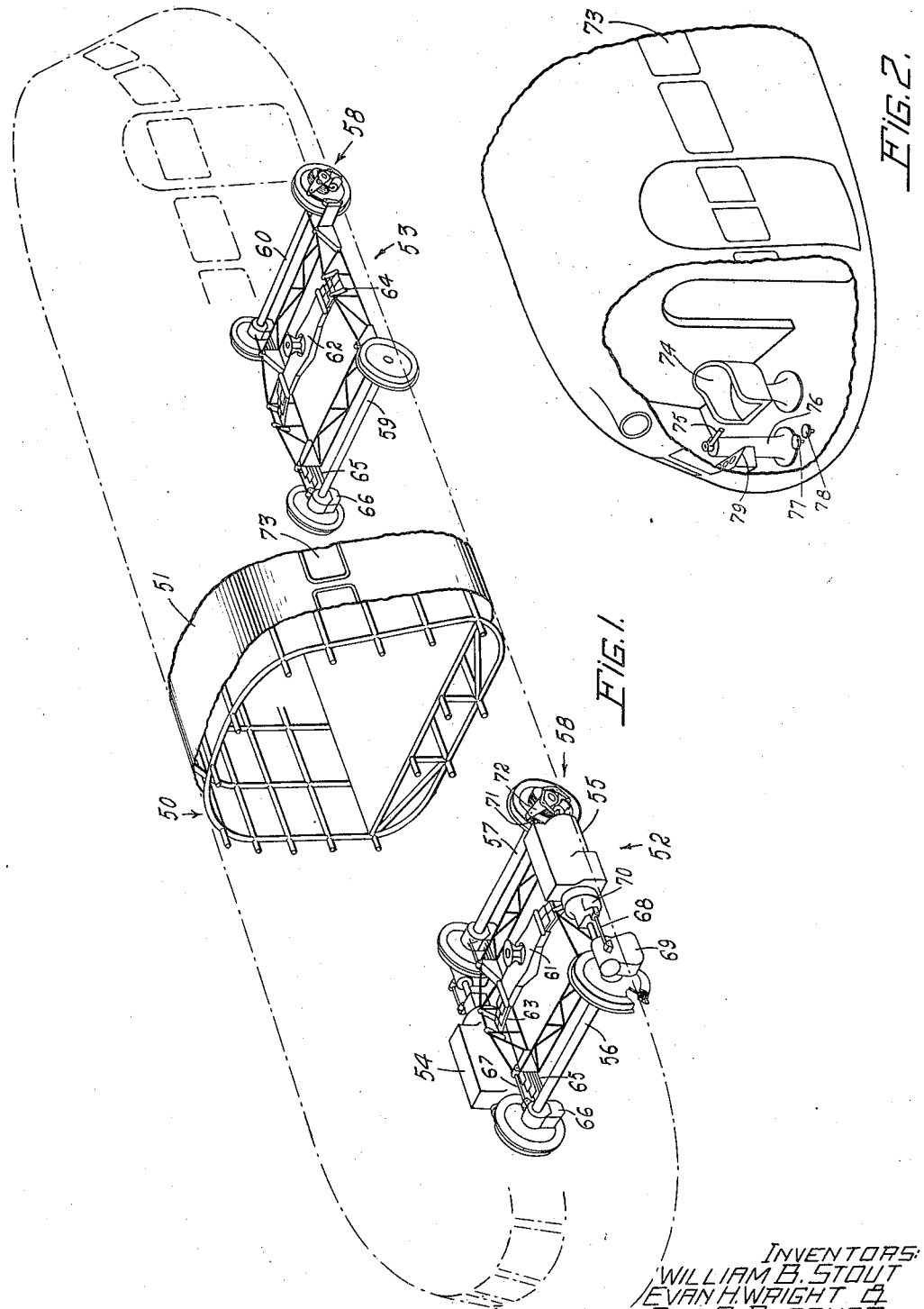
INVENTORS:
WILLIAM B. STOUT
EVAN H. WRIGHT &
ORA G. BLOCHER.
by Gillson, Swann & Cox
ATTYS.

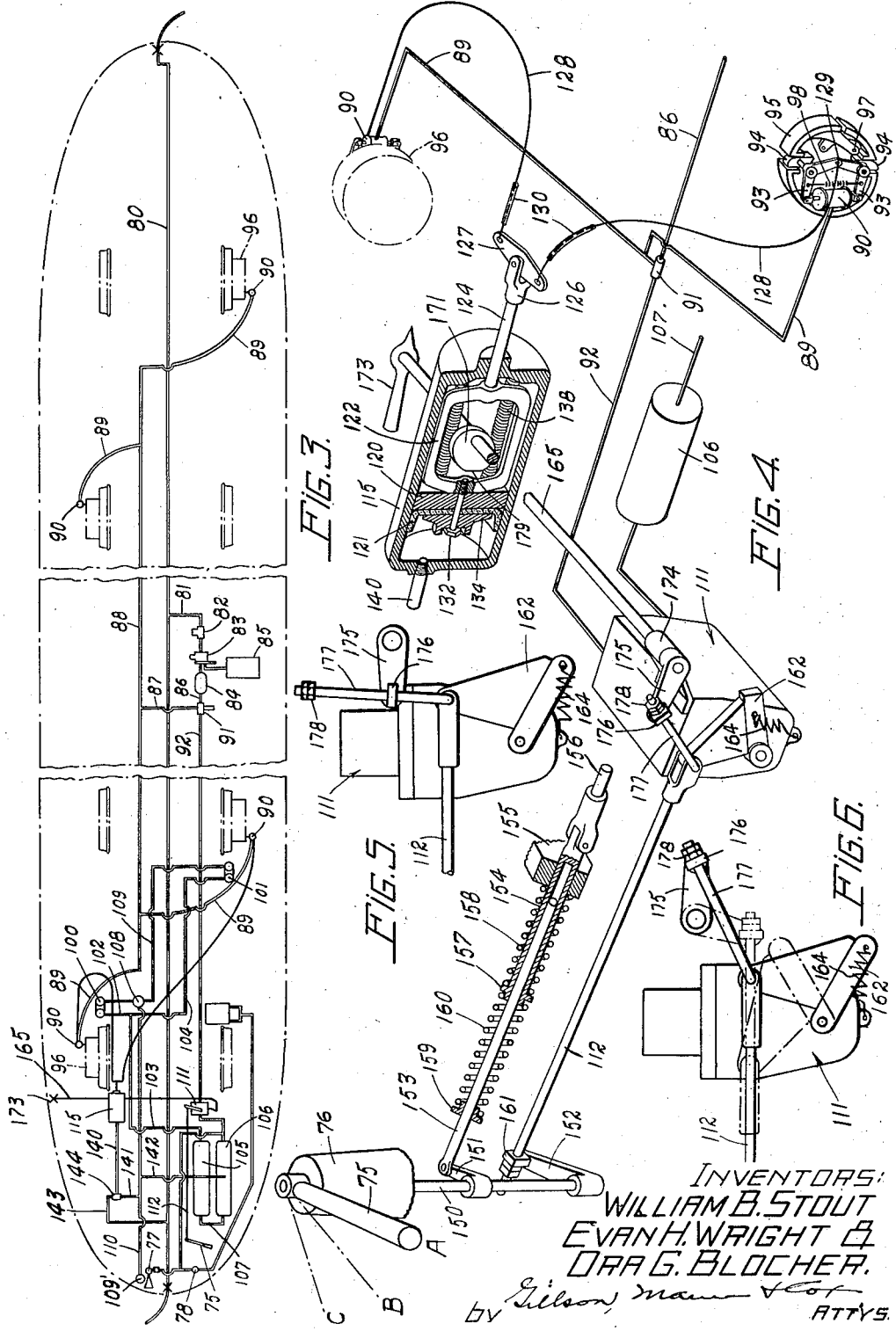

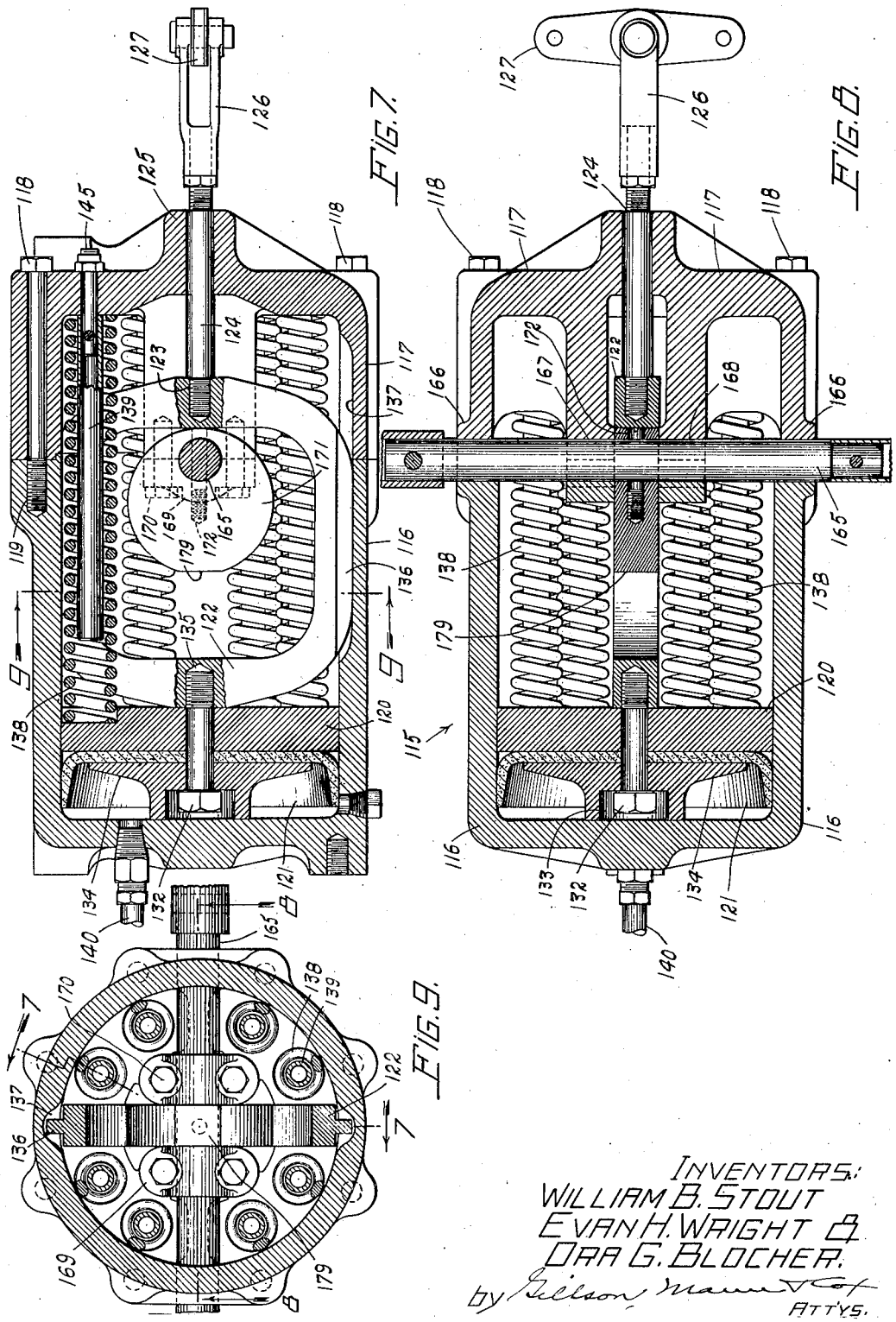

Patented Oct. 6, 1936

2,056,223

UNITED STATES PATENT OFFICE 2,056,223

BRAKE SYSTEM FOR VEHICLES

William B. Stout and Evan H. Wright, Detroit, and Ora G. Blocher, Dearborn, Mich., assignors to Pullman-Standard Car Manufacturing Company, a corporation of Delaware Application October 16, 1933, Serial No. 693,734

11 Claims. (Cl. 303—18)

This invention relates to a system of brakes for railway cars and has for its principal objects to provide a brake system which is thoroughly dependable under all conditions of service; which enables the car to be operated as a single unit, or in combination with a locomotive-drawn train; which is equipped with an emergency brake that is automatically thrown into action upon failure of the service brake; which is provided with means for releasing the car brakes, either service or emergency, from the exterior of the car in order that yardmen may move the car about without entering the car; and which automatically renders the releasing means ineffective upon subsequent normal operation of the service brake, from the motorman's cab.

Although the invention is described as applied to a railway car of particular design, it will be understood that the system is equally applicable to other vehicles with corresponding advantages; also it will be understood that the braking system may be modified within the scope of the appended claims.

Further and other objects and advantages will become apparent as the disclosure proceeds and the description is read in conjunction with the accompanying drawings, in which Fig. 1 is a diagrammatic, perspective view of a high speed rail car;

Fig. 2 is a view looking into the interior of the motorman's cab;

Fig. 3 is a diagrammatic lay-out in plan of the brake system;

Fig. 4 is a semi-diagrammatic, perspective view of the principal elements of the brake system;

Fig. 5 shows another position of the air brake valve;

Fig. 6 illustrates the action which takes place when the air brake is manually released by the shaft which is operable from the side of the car; also the means for rendering the release ineffective upon subsequent operation of the air brake;

Figs. 7 and 8 are sectional views of the emergency brake cylinder and piston, the sections being taken on the lines 7—7 and 8—8 of Fig. 9;

Fig. 9 is a transverse, sectional view taken on the line 9—9 of Fig. 7.

Referring first to Fig. 1, the car comprises a space framework 50 of metal tubing that is welded together to form a rigid unitary body. The framework is covered by a metal skin 51, which is secured to the framework and assists in resisting torsional strain.

The body is supported by a front truck 52 and a rear truck 53, the former having internal combustion engines 54 and 55, mounted outboard on opposite sides of the truck. The front truck includes wheeled axles 56 and 57, diametrical ends of which are driven by the motors 54 and 55. The other diametrical ends of the axles 56 and 57 are equipped with brake operating mechanism, generally indicated at 58.

The rear truck 53 includes wheeled axles 59 and 60, each of which is braked by mechanism corresponding to the mechanism 58 of the front truck.

The driving motors are preferably either gasoline or Diesel engines, and each has a horsepower rating of 160 or more, the exact rating, of course, being dependent on the performance desired.

The axles of both front and rear trucks are equipped with what may be termed "resilient" wheels, and this term is intended to include all forms of wheels which are inherently resilient either by the interposition of rubber under shear, pneumatic tires, springs, or by any other means.

The car body rests upon swing bolsters 61 and 62 of the front and rear trucks, respectively, and, preferably, the bolsters are equipped with cantilever springs 63 which are shackled to swing hangers 64 pivotally suspended from the truck frames.

The truck frames of each truck are fabricated of metal tubing welded together in such manner as to produce space frameworks of necessary strength, and at the four corners of each frame, a leaf spring 65 projects toward the adjacent axle where it connects to a journal 66. The point of connection between the projecting spring and the journal, is, in each case, beneath the axle, so that the truck is underslung with respect to the axles.

Driving and braking forces applied to the car axles are transmitted to the truck frames by radius rod 67. Other radius arms 68 which connect the worm gear casing 69 to a fixed point on the car truck,—in this case, the transmission housing 70,—take the thrust of the driving worm. Braking forces are resisted by torque arms 71 which connect the brake housing 72 to the truck frame.

In Figs. 1, 2, and 3, the front of the car is to the left and it will be observed that the body is elongated and has a tapering blunt nose and tail to reduce wind resistance. The outer surface of the car consists of smooth broad curves well blended together to produce a graceful appearance, and at the same time directing the air currents around the car with minimum effort. The windows 73 are flush with the outer skin, and are made stationary, as it is contemplated that a forced system of ventilation will be used.

The bottom of the car is uninterrupted in outline, except for the wheels of the truck which project through the metal skin enveloping the body framework.

The motorman's cab (Fig. 2) occupies the front portion of the car and the several windows in the cab give the motorman a wide angle of visibility. The motorman sits in a seat 74 and controls the car by a combined throttle and brake lever 75 which projects laterally from a column 76 located on the right side of the seat. Obviously the control could be on the left side if desired.

A horn or whistle (not shown) is adapted to be operated by a foot pedal 77 conveniently located near the motorman's foot, and a similar foot pedal 78 is provided for operating the sander when the tracks are slippery. All instruments, such as tachometers, speedometers, oil and gasoline gauges, etc. are conveniently placed on an instrument panel 79 which is located directly in front of the motorman.

The automatic air brake

Referring now to Fig. 3, the reference character 80 designates a brake pipe which runs the entire length of the car and is provided at both ends with angle cocks so that the car may be connected to a train and have its brakes operated in the usual manner from the engineer's cab of the locomotive. The car is equipped with a centrifugal dust collector 82, triple valve 83, air reservoirs 84 and 85 of conventional type; and when the air pressure in the brake pipes 80 and 81 is reduced either by manipulation of the brake valve in the engineer's cab or by a break in the train line, the triple valve 83 permits compressed air to be drawn from the auxiliary reservoir 85 and conducted thru pipes 86, 87, 88, and 89 to the air brake cylinders 90 which constitute a part of the brake mechanism 58. A double check valve 91 located at the junction between the pipes 86, 87 and the control pipe 92 closes the latter pipe by pressure differential.

The air cylinder 90 (Fig. 4) is equipped with opposed pistons which are forced apart when air is admitted to the cylinder and, in consequence, the bell crank levers 93 are rocked which causes the cams 94 to press the brake shoes 95 against the interior of the brake drum 96 and bring the car to a stop. The shoes, it will be observed, are pivoted on studs 97 which are fixed to the brake housing 72 (not shown in Fig. 4, but see Fig. 1). When the pressure in the cylinder 90 is released, springs 98 return the parts to their normal position.

It will be understood that the illustration of the brake mechanism 58 in Fig. 4 is shown more or less diagrammatically to assist in explaining its operation.

The automatic air brake above described, in so far as it pertains to the dust collector 82, the triple valve 83, and the two air reservoirs, is standard equipment on many railway cars in service at the present time, and further description is, therefore, unnecessary. It is provided here to enable the car to be coupled in a train if desired.

The unit car service brake

When the car is operated as a single unit, as is normally the case, the automatic air brake performs no function in braking the car, but in its place is an air brake which receives its supply of compressed air from compressors 100 and 101 which are driven by the motors 54 and 55.

Throughout this specification and in the appended claims, the term "air brake" is intended to include all forms of air brakes, whether operating on super-atmospheric pressure, or sub-atmospheric pressure, the latter being commonly known as vacuum brakes. For convenience of terminology, the term "air brake" is used in its more generic sense.

The compressors 100 and 101 are connected by pipes 102, 103, and 104 to air reservoirs 105 and 106, the two reservoirs being connected together by a pipe 107.

A pressure governor 108 located in the pipe 109 which joins the two compressors regulates the operation of the compressors and a pressure gauge 109' on the instrument board which connects with the pressure governor 108 and the storage tank 106 through a pipe 110 indicates to the motorman the air pressure available for braking.

A brake valve 111, preferably a Westinghouse R3 valve, is located beneath the floor truss and is actuated through a rod 112 (Fig. 4) from the motorman's control lever 75. When the valve is opened, as it is when in the position shown in Fig. 4, air passes from the reservoirs 105 and 106 to the control pipe 92, and since the automatic air brake is inoperative, the pressure differential moves the check valve to a position which connects the pipe 92 with the pipe 87 and the brakes are thereby applied. Upon closing the brake valve 111, pressure in the pipe 92 is reduced, and the brakes are released.

The emergency brake

An emergency brake is provided which is automatically thrown into action whenever the service brake,—i. e. the air brake which operates through the valve 111,—is for some reason rendered inoperative. When the service brake again becomes operative, the emergency brake is automatically released.

The emergency brake consists of a cylinder 115 (Figs. 3, 4, 7, and 8) composed of two halves 116 and 117; studs 118 which screw into tapped holes 119 hold the two parts together.

Within the cylinder is a piston 120 which carries a leather washer 121 on one face and a yoke 122 on its opposite face, the latter being secured at 123 to a push rod 124 that emerges from the cylinder through a boss 125 and is equipped at its outer end with a jaw 126 supporting an equalizer lever 127.

The two ends of the equalizer lever are joined by cables 128 (Fig. 4) to the ends 129 of the bell cranks 93 so that when tension is applied to the cables, the bell cranks are rotated and the cams 94 urge the brake shoes 95 into engagement with the brake drums to bring the car to a stop. The cables 128 are covered by metal sheaths 130 fixed to the truck frames so that the pull on the cables is properly directed.

The leather washer 121 is secured to the piston 120 by a bolt 132, the head of which seats in a recess 133 of a clamping plate 134. The bolt screws into the yoke as indicated at 135.

The yoke 122 is in the form of a loop and is maintained in a fixed plane by flanges 136 which are adapted to travel in grooves 137 provided in the side walls of the cylinder. This is clearly shown in Fig. 9.

A plurality of helical springs 138, telescoped over tubes 139 which act as stops in limiting the movement of the piston to the right (Fig. 7), constantly urge the piston 120 to the left, in which position the cables 128 are under tension and the brakes consequently are applied.

However, the piston 120 is also normally urged to the right (Fig. 7) by air pressure between the washer 121 and the end of the cylinder casting 116, the air being introduced into the space through a pipe 140 which is connected by pipes 141 and 142 to the air reservoir 106.

The stiffness of the springs 138 is adjusted so that as long as the air pressure on the head of the piston is above a certain amount, i. e. the minimum amount required for operation of the air brakes, the piston is held by the air pressure against the stops 139 and since the push rod 124 moves with the piston, the emergency brakes are released. But should the air pressure fall below that required for brake operation, the springs 138 will move the piston to the left and thus cause the brakes to be applied.

It will be observed by reference to Fig. 3, that the emergency brake also operates in conjunction with the automatic air brake, for a pipe 143 which is tapped into the brake pipe 80 connects to the pipe 140 through a double check valve 144, and supplies air under pressure to the brake cylinder. The double check valve selects which one of the pipes 141 and 143 is in communication with the pipe 140, the selection being made by difference in pressure.

The stops 139 are held in position by bolts 145, as shown in Fig. 7.

Throttle and brake control

The brake system of this invention is equipped with a "dead-man" control, i. e. the brakes are automatically applied whenever the motorman's hand is removed from the control lever. Since the throttle and brakes are controlled by a single lever 75 a rather unconvenional "dead-man" control must be employed.

Referring to Fig. 4, the control lever 75 is shown in full braking position, this position being marked A. When the lever is moved to position B, the brakes are released and the throttle is closed. Upon moving the lever from position B to position C, the throttle is opened.

The control lever 75 is fixed to a vertical shaft 150 which extends axially through the pedestal 76, and is equipped with a throttle arm 151 and a brake arm 152.

A rod 153 is pivoted to the end of the throttle arm 151 and this rod is adapted to telescope into a sleeve 154 that is slidably mounted in the bracket 155 fixed to the car frame. The end of the sleeve, which is remote from the control pedestal 76, is joined to a push rod 156 that operates the throttle valves (not shown) of the two driving engines, and the other end of the sleeve is provided with a flange 157 which forms an abutment for the spring 158 telescoped over the sleeve. The spring tends to close the throttle and is compressed whenever the throttle is opened.

An annular flange 159 is fixed on the rod 153 to form a stop for the spring 160 which is telescoped over the rod and abuts against the flange 157 on the sleeve 154. The spring 160 functions to move the rod 153 to the left (Fig. 4) whenever such movement is unresisted by pressure on the control lever 75. In this manner, the throttle lever is held in position A with the brakes applied.

When the throttle lever is in position B, the rod 153 is in contact with the bottom of the sleeve 154 so that movement of the lever from position B to position C operates the engine throttles. When the throttle lever, however, moves from position B to position A, lost motion occurs in the throttle connection by the rod 153 leaving the bottom of the sleeve 154.

The brake arm 152 has a lost motion connection, as indicated at 161, with the brake rod 112, so that when the throttle lever is moved from position B to position C, there is no corresponding movement of the rod 112.

The air brake valve 111 is provided with a bell crank 162, joined at its end with the brake rod 112. The bell crank is normally held in release position by a spring 164, but this spring is weaker than the spring 160 which applies the brakes when the motorman's hand leaves the control lever 75. The release spring is necessary to move the rod 112 to the right, Fig. 4, when the control lever is moved to the position B because of the lost motion connection at 161.

The full braking position of the air valve 111 is shown in Fig. 4, and the release position is shown in Fig. 5.

Manual release

It will be clear from the preceding description that whenever the car is left standing in the yards, either the service brake or the emergency brake will be applied. If there is air in the reservoirs 105 and 106, the dead-man control will operate to apply the service brakes, while if the air has leaked out of the reservoirs, the springs in the emergency brake cylinder will have moved the piston to a position in which the emergency brakes are applied.

It is desirable to provide means for manually releasing the brakes from the exterior of the car so that workmen can move the car in the yards without entering the motorman's cab. This is accomplished in the present case by providing a shaft 165 which can be rotated from the side of the car and which is adapted to mechanically release whichever of the two brakes is functioning.

The shaft 165 extends transversely of the car in a horizontal position and passes through the emergency brake cylinder 115. By referring to Figs. 7 to 9 inclusive, it will be seen that the shaft enters the cylinder through bosses 166 and is supported within the cylinder on bearings 167 and 168 which include bearing caps 169 secured in place by studs 170. Suitable stops, not shown, are provided to limit rotation of the shaft to 180°.

Between the bearings 167 and 168 is a cam 171 secured to the shaft by a countersunk screw 172 which passes through the shaft. The shaft, it will be observed, as well as the cam, lies within the yoke 122.

It is apparent that when the shaft 165 is rotated through 180° by grasping the handle 173 and moving it downwardly, the cam 171 forces the piston 120 to the right (Fig. 7) against the compression of springs 138, thereby releasing the emergency brake in case the air pressure had fallen below the minimum for which the emergency brake was set. Thus in Fig. 7, the emergency brake is shown applied, and rotation of the shaft 165 through 180° releases the emergency brake. In Fig. 4, however, the emergency brake is shown in release position by virtue of the air pressure being exerted upon the head of the piston and, consequently, rotation of the shaft 165 will only serve to lock the emergency brake in release position.

The inner end of the shaft 165 is supported on the brake valve 111 by the bracket 174 and carries at its extremity an arm 175 equipped with a collar 176 through which a rod 177 is adapted to slide, one end of the rod being pivoted to the connection between the brake rod 112 and the bell crank 162.

The other end of the rod is equipped with stop nuts 178 which provide limited lost motion between the arm 175 and the rod 177.

In the normal operation of the brakes, the rod 177 moves from the position in which it is shown in Fig. 4 to a position such as shown in Fig. 5 when the brakes are released, so that operation of the brake valve 111 has no effect upon the shaft 165. However, when the shaft 165 is rotated through 180° to release the brakes for moving the car to a siding, there is at first a slight lost motion as the shaft is rotated through the first part of the arc, and then the stop nuts 178 engage the collar 176, and the rod 112 is moved to the right a sufficient distance to release the air brake. The full line position of the arm 175, rod 177, and bell crank 162 in Fig. 6 illustrates how this operation is accomplished.

When the shaft 165 has been turned to release position so that the arm 175 is pointed to the right, as shown in full lines in Fig. 6, the air brake valve 111 is held in release position even though the spring 160 is urging it into brake applying position. The reason for this is that the cam 171 is flattened, as indicated at 179, so that when it is holding the emergency brake in off position, the shaft 165 is yieldingly kept from rotating by the compression of the springs 138. The extent of the flattened surface 179 is sufficient to hold the brakes released in spite of rough handling of the car.

If the yardmen should forget to return the shaft 165 to the position in which it is shown in Fig. 4, no harm is done for subsequent operation of the service brake by movement of the lever 75 automatically renders the manual release on the shaft 165 ineffective.

This is clearly shown in Fig. 6 in which the full line positions of the arm 175, the bell crank 162 and the rod 177 indicate the position of the parts in case the shaft 165 is negligently left in release position. If the motorman starts the car by moving the control lever 75 from position B to C, the lost motion connection at 161 results in the brake 112 remaining in its release position. Upon moving the control lever 75 from B to A, in order to apply the brakes, the arm 152 upon passing the neutral position picks up the rod 112 and causes the parts to be moved to the dotted line position shown in Fig. 6, the brakes being applied without hindrance. The arm 175 being moved through more than 90° causes the cam 171 to be moved through a corresponding angle and it will be seen by reference to Fig. 7 that a movement of more than 90° from brake release position will bring the cam to substantially the position in which it is shown in Fig. 6. Both air and emergency brakes, therefore, are reset for normal operation.

What we claim, therefore, is:

1. In a brake system for vehicles, a service brake operating mechanism, means for operating the service brake operating mechanism from within the vehicle, an emergency brake operating mechanism, means for automatically operating the emergency brake operating mechanism upon failure of the service brake operating mechanism, and a common release means for both of said mechanisms, said common release means being adapted to be operated manually.

2. In a brake system for vehicles, a service brake operating mechanism, means for controlling the operation of the service brake from within the vehicle, an emergency brake operating mechanism, means for automatically operating the emergency brake operating mechanism upon failure of the means for actuating the service brake, and a manual release for each of said brakes operable from without the vehicle, said release being rendered ineffective upon a subsequent operation of said first-named means.

3. In a brake system for vehicles, a fluid brake operating mechanism, a source of fluid, means within the vehicle for controlling operation of the fluid brake operating mechanism, an emergency brake operating mechanism including a brake cylinder, a piston in the cylinder normally holding the brakes in release position by fluid pressure from said source, means responsive to changes in the fluid pressure for moving the piston to operate the brakes, and a manual release for said fluid and emergency brake operating mechanisms extending to and operable from the outside of the vehicle.

4. In a brake system for vehicles, a fluid brake operating mechanism, a source of fluid, means within the vehicle for controlling the operation of the fluid brake mechanism, an emergency brake mechanism including a brake cylinder, a piston in the cylinder normally holding the brake mechanism in release position by fluid pressure from said source, means responsive to changes in the fluid pressure for moving the piston to operate the brake mechanism, and a manual release for both fluid and emergency brake mechanisms operable from the outside of the vehicle independently of fluid pressure, said release including a cam for moving the piston to its normal inoperative position.

5. In a brake system for vehicles, a fluid brake mechanism, a source of fluid, means for operating the fluid brake mechanism from within the vehicle, an emergency brake mechanism including a brake cylinder, a piston in the cylinder normally holding the brakes in release position by fluid pressure from said source, means responsive to changes in the fluid pressure for moving the piston to operate the brake mechanism, and a manual release for both fluid and emergency brake mechanisms operable from the outside of the vehicle, said release including a shaft passing through the cylinder, a cam on the shaft adapted to hold the piston in inoperative position, and an arm on the shaft cooperating with the fluid brake valve to move the latter to closed position.

6. In a brake system for vehicles, a fluid brake valve, means for operating the valve from within the vehicle, a manual release for the valve operable from the exterior of the vehicle, said release being rendered automatically ineffective after being turned to brake releasing position upon subsequent operation of the fluid brake valve.

7. In a vehicle truck, a brake system for said truck, said system comprising a service brake operating mechanism, means for releasing said mechanism, an emergency brake operating mechanism, and a common means additional to the first named releasing means for manually releasing both of said mechanisms.

8. In a vehicle, brake elements, service brake operating means for applying and releasing at least certain of said brake elements, a control for said means, emergency brake operating mechanism for applying at least certain of said brake elements when said means ceases to function to apply any of said elements, and a device operable independently of said control for holding brake elements released when applied by either said means or mechanism, and means operable upon a subsequent normal operation of said service brake operating means for restoring said device to inoperative position.

9. In a brake system, a service brake operating mechanism, an emergency brake operating mechanism, means for automatically operating the emergency brake operating mechanism upon failure of said service brake mechanism, means for locking said emergency brake mechanism in released position, and means for automatically releasing said locking means operable upon a subsequent operation of said service brake.

10. In a brake system, an air brake mechanism, a source of compressed air for operating said mechanism, an emergency brake mechanism, means for automatically operating the emergency brake mechanism whenever the compressed air falls below a given pressure, said means including a brake cylinder and a spring pressed piston normally held in released position by air pressure from said source, means for locking said emergency brake mechanism in released position, and means for automatically releasing said locking means operable upon a subsequent operation of said air brake mechanism.

11. In a brake system, a fluid operated brake mechanism, a source of fluid, an emergency brake mechanism including a brake cylinder, a piston in the cylinder normally holding the brakes in release position by fluid pressure from said source, means responsive to a change in fluid pressure for moving the piston to apply said brakes, means for manually locking said emergency brake mechanism in released position, and means operable upon subsequent operation of the fluid brake mechanism for restoring said emergency brake mechanism to unlocked position.

WILLIAM B. STOUT.
EVAN H. WRIGHT.
ORA G. BLOCHER.